US008856026B2

(12) United States Patent
Foodman et al.

(10) Patent No.: US 8,856,026 B2
(45) Date of Patent: Oct. 7, 2014

(54) MULTIPLE LOCATION REBATE PROCESSOR

(75) Inventors: Jason Foodman, Atlanta, GA (US); Lance Deutsch, Charlotte, NC (US)

(73) Assignee: The Ohana Companies, Inc., Wilmington, DE (US)

(*) Notice: Subject to any disclaimer, the term of this patent is extended or adjusted under 35 U.S.C. 154(b) by 1145 days.

(21) Appl. No.: 12/385,409

(22) Filed: Apr. 7, 2009

(65) Prior Publication Data
US 2010/0257047 A1  Oct. 7, 2010

(51) Int. Cl.
*G06Q 30/00* (2012.01)
*G06Q 30/02* (2012.01)
*G06Q 30/04* (2012.01)
*G06Q 20/40* (2012.01)
*G06Q 20/38* (2012.01)
*G06Q 20/04* (2012.01)
*G06Q 10/10* (2012.01)
*G06Q 20/00* (2012.01)

(52) U.S. Cl.
CPC ............ *G06Q 30/04* (2013.01); *G06Q 30/0225* (2013.01); *G06Q 20/40* (2013.01); *G06Q 20/387* (2013.01); *G06Q 20/042* (2013.01); *G06Q 10/10* (2013.01); *G06Q 20/00* (2013.01)
USPC ................ 705/14.34; 705/14.1; 705/14.39; 705/14.37; 705/14.38

(58) Field of Classification Search
USPC ............. 705/14.34, 14.1, 14.39, 14.37, 14.38
See application file for complete search history.

(56) References Cited

U.S. PATENT DOCUMENTS

| | | | |
|---|---|---|---|
| 6,450,407 B1 * | 9/2002 | Freeman et al. | 235/492 |
| 6,847,935 B1 * | 1/2005 | Solomon et al. | 705/14.23 |
| 6,865,544 B1 * | 3/2005 | Austin | 705/14.34 |
| 7,120,591 B1 * | 10/2006 | Solomon et al. | 705/14.34 |
| 7,146,328 B1 * | 12/2006 | Solomon et al. | 705/14.34 |
| 2001/0034682 A1 * | 10/2001 | Knight et al. | 705/35 |
| 2002/0161641 A1 * | 10/2002 | Quinlan et al. | 705/14 |
| 2004/0215514 A1 * | 10/2004 | Quinlan et al. | 705/14 |
| 2007/0055625 A1 * | 3/2007 | Sheehan et al. | 705/39 |
| 2007/0061223 A1 * | 3/2007 | Rodriguez et al. | 705/26 |
| 2008/0126249 A1 * | 5/2008 | Garcia | 705/42 |
| 2008/0167989 A1 * | 7/2008 | Conlin et al. | 705/44 |
| 2008/0275819 A1 * | 11/2008 | Rifai | 705/44 |
| 2009/0089172 A1 * | 4/2009 | Quinlan et al. | 705/17 |

FOREIGN PATENT DOCUMENTS

WO  WO9723838  * 7/1997  ............ G06F 17/60

* cited by examiner

*Primary Examiner* — Luis A Brown
(74) *Attorney, Agent, or Firm* — McKenna, Long & Aldridge LLP (57) ABSTRACT

The present disclosure generally relates to the administration of rebates in different geographic locations and optimization of rebate processing. In an embodiment, a rebate processing device can detect a location of a consumer, and based on the location generate a rebate form in a language which corresponds to the location or preference of the consumer. The generated rebate form can include a mailing address to mail the form for processing, which may based on the location of the consumer and a rebate identifier to identify the rebate to transact. A rebate center device can receive completed rebate forms, extract rebate identifiers from the completed rebate forms, and send the extracted rebate identifiers to the rebate processing device to expedite processing. Rebate processing device can verify the rebate identifiers are not fraudulent and generate a payment for the validated rebate identifiers based on the location of the consumer.

14 Claims, 8 Drawing Sheets

MULTIPLE LOCATION REBATE PROCESSOR

BACKGROUND

1. Field

The present disclosure generally relates to rebate processors. More specifically, the present disclosure relates to systems which process or administer rebates in multiple geographic areas.

2. Discussion of the Related Technology

Generally described, rebates can be an amount paid back to a consumer, such as a refund or return, after the consumer purchases a product. Rebates are commonly offered by manufacturers or retailers to provide incentives for consumers to boost product sales. In a conventional mail-in rebate, a buyer of a product usually mails in a receipt, barcode, and a coupon to redeem a rebate offer. Processing of the rebate can then be handled by a rebate clearinghouse which processes the rebate and sends a rebate check to the buyer. Typically, the rebate clearinghouse contracts with the manufacturer or retailer to administer the rebate. In addition, computer-aided rebate systems can also be used to facilitate the processing of rebates.

Unfortunately, these and other rebate processing technologies have many shortcomings. For example, typically rebates are limited to a single geographic area (e.g. United States), use a single language (e.g. English), provide coupons designating a single mail-in address, and provide a refund in a single currency (e.g. United States dollar). Accordingly, rebate offerings are often ineffective because consumers located in different geographic areas or countries are reluctant to purchase products with rebates.

SUMMARY

The present disclosure generally relates to the administration of rebates on a global scale, such as in different regions, geographic locations, or countries, and optimization of rebate processing. In some embodiments, a rebate processing device can include a form generation engine to detect a location of a consumer, and based on the location of the consumer generate a rebate form in a language which corresponds to the location or preference of the consumer. The preference of the consumer can be determined by a setting of a web browser used by the consumer.

The generated rebate form can be sent over a network interface to the consumer. The generated rebate form may include a mailing address to mail the form for processing, which may be based on the location of the consumer. The generated rebate form can also include a rebate identifier to identify the rebate to transact which can be encoded as a bar code. The rebate processing device may also include a rebate information repository having parameters related to various rebates. The rebate information repository can include locations in which a rebate is available, payment options, currencies, value of the rebate, or other options selected by subscribers or customers of a rebate processing service, such as manufacturers or product retailers.

In an illustrative embodiment, a rebate center device receives completed rebate forms from consumers. The rebate center device can include an extraction engine to extract rebate identifiers from each of the completed rebate forms and send one or more of the extracted rebate identifiers to the rebate processing device over a network interface to expedite processing of the completed rebate forms. The rebate identifiers may be extracted by decoding a bar code, for example. Subsequently, the rebate center device can send rebate forms associated with the one or more extracted rebate identifiers to the rebate processing device.

In the present disclosure, rebate processing device can further include a collection engine, validation engine, and payment engine. Collection engine can receive the extracted rebate identifiers from a plurality of rebate center devices which may be distributed in different countries, for example. Validation engine can verify the rebate identifiers which identify various rebates to transact are not fraudulent. Payment engine can then generate a payment using a payment method for each of the validated rebate identifiers based on the location of the consumer and/or using information from the rebate information repository. The payment method can include a type of currency and an amount, a check from a financial institution, or a deposit to a financial institution. The collection engine can further receive the completed rebate forms associated with the rebate identifiers after the rebate identifiers are initially received and store the completed rebate forms in computer storage.

Advantages and features of the disclosure in part may become apparent in the description that follows and in part may become apparent to those having ordinary skill in the art upon examination of the following or may be learned from practice of the disclosure. The advantages and features of embodiments of the present disclosure may be realized and attained by the structures and processes described in the written description, the claims, and in the appended drawings.

It is to be understood that both the foregoing general description and the following detailed description are exemplary and explanatory and should not be construed as limiting the scope of the claims.

BRIEF DESCRIPTION OF THE DRAWINGS

The accompanying drawings are included to provide a further understanding of the disclosure, and are incorporated herein and constitute a part of this application. The drawings together with the description serve to explain exemplary embodiments of the present disclosure. In the drawings.

DESCRIPTION OF THE EMBODIMENTS

The present disclosure generally relates to the administration of rebates on a global scale, such as in different regions, geographic locations, or countries, and optimization of rebate processing. In some embodiments, a rebate processing device can include a form generation engine to detect a location of a consumer, and based on the location generate a rebate form in a language which corresponds to the location or preference of the consumer. The preference of the consumer can be determined by a setting of a web browser used by the consumer.

The generated rebate form can be sent over a network interface to the consumer. The generated rebate form may include a mailing address to mail the form for processing, which may based on the location of the consumer. The generated rebate form can also include a rebate identifier to identify the rebate to transact which can be encoded as a bar code. The rebate processing device may also include a rebate information repository having parameters related to various rebate offerings. The rebate information repository can include locations a rebate is available in, payment options, currencies, value of the rebate, or other options selected by subscribers or customers of a rebate processing service, such as manufacturers or retailers.

In an illustrative embodiment, a rebate center device receives completed rebate forms from consumers. The rebate center device can include an extraction engine to extract rebate identifiers from each of the completed rebate forms and send one or more of the extracted rebate identifiers to the rebate processing device over a network interface to expedite processing of the completed rebate forms. The rebate identifiers may be extracted by decoding a bar code, for example. Subsequently, the rebate center device can send rebate forms corresponding to the one or more extracted rebate identifiers to the rebate processing device.

In the present disclosure, rebate processing device can further include a collection engine, validation engine, and payment engine. Collection engine can receive the extracted rebate identifiers from a plurality of rebate center devices which may be distributed in different countries, for example. Validation engine can verify the rebate identifiers which identify various rebates to transact are not fraudulent. Payment engine can then generate a payment using a payment method for each of the validated rebate identifiers based on the location of the consumer and/or using information from the rebate information repository. The payment method can include a type of currency and an amount, a check from a financial institution, or a deposit to a financial institution. The collection engine can further receive the completed rebate forms corresponding with the rebate identifiers after the rebate identifiers are initially received and store the completed rebate forms in computer storage.

In accordance with an illustrative embodiment, the rebate processing device and rebate center device can offer multi-lingual rebate forms, distributed geographic rebate entry points, and local payment capabilities in a distributed global environment (e.g. multiple currencies). The present disclosure may be particularly beneficial for product rebate offerings that have traditionally been limited to a single geography. However, one skilled in the relevant art will appreciate that the disclosed rebate processing device, rebate center device, and consumer device are illustrative in nature and should not be construed as limiting. Additionally, the present disclosure should not be construed to be applicable to any particular rebate processing device or rebate center device and all disclosed embodiments are illustrative in nature.

Reference will now be made in detail to the specific embodiments of the present disclosure, examples of which are illustrated in the accompanying drawings. Wherever possible, the same reference numbers will be used throughout the drawings to refer to the same or like parts.

Figure 1A:
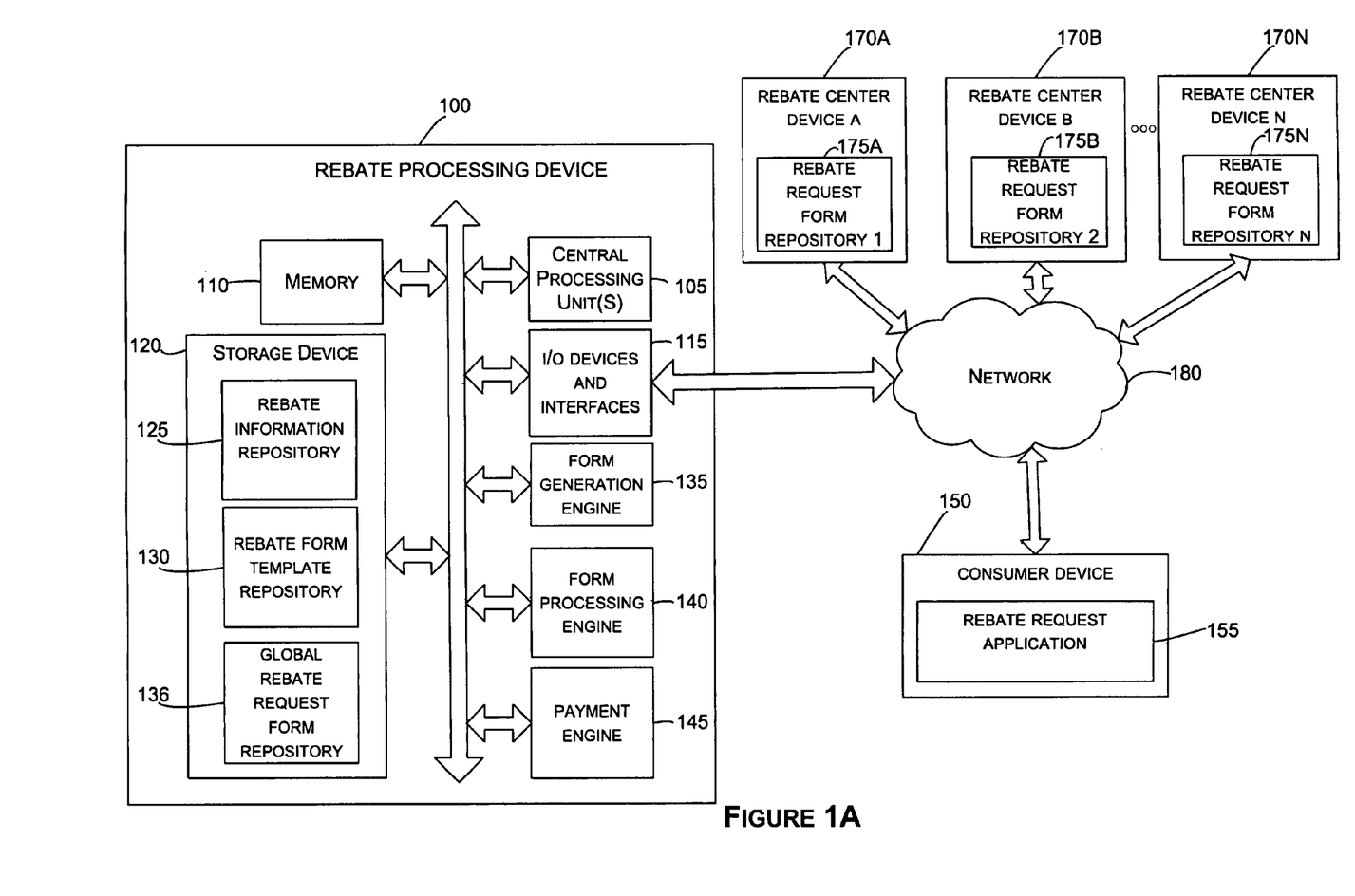
FIGS. 1A-C illustrate block diagrams of exemplary systems capable of processing rebates, according to embodiments of the disclosure.

FIG. 1A illustrates a block diagram of an exemplary system capable of processing rebates. As shown, a consumer device 150 communicates with a rebate processing device 100 and rebate center devices 170A, 170B, and 170N (representative of any number of rebate center devices) over a network 180. Communication within the system may take place over network 160 using sockets, ports, and other mechanisms known in the art. The communication may also be via wires, wireless technologies, cables, or other digital or analog techniques and devices to perform those techniques over a local area network (LAN), wide area network (WAN), or the internet, for example. Of note, consumer device 150, rebate processing device 100, and rebate center devices 170A-N may reside on physically separate machines, such as computers, or be on the same machine.

Consumer device 150 may be a computing system, mobile device, or other device that allows a user, to exchange information with the rebate processing device 100 or plurality of rebate center devices 170A-N. Consumer device 150 can include one or more central processing units (CPUs), a memory, such as random access memory (RAM), to store information temporarily or permanently, one or more input/output (I/O) devices and interfaces, such as a network interface or card, keyboard, and the like to receive or transmit data. Consumer device 150 may further comprise a storage device, such as one or more hard drives. The storage device includes one or more data repositories having a variety of structured or unstructured content, such as file systems or databases. Components of consumer device 150 can be interconnected using a standards based bus system, such as Peripheral Component Interconnect (PCI), for example. Consumer device 150 may include various operating systems, hardware resources, and be on different network domains. The operating systems may manage the various hardware resources and provide a graphical user interface (GUI).

In particular, consumer device 150 may include a rebate request application 155 that allows the user, such as a consumer or buyer of a product or service, to receive a rebate form from rebate processing device 100. Rebate request application 155 can include an application running in a web browser or an electronic mail client, for example. In addition, rebate request application 155 may allow the consumer to complete the received rebate form and transmit the completed rebate form to at least one of the rebate center devices 170A-N.

The rebate processing device 100 can be a computing system, such as one or more computer servers or a peer-to-peer architecture, which processes or administers rebate offerings from subscribers or customers of a rebate processing service, such as manufacturers or retailers of a product or service (e.g. computer software). Rebate processing device 100 can include one or more central processing units (CPUs) 105. In addition, rebate processing device 100 can also include a memory 110, such as random access memory (RAM), to store information temporarily or permanently. Rebate processing device 100 may further include one or more input/output (I/O) devices and interfaces 115, such as a network interface or card, keyboard, and the like to receive or transmit data.

Rebate processing device 110 may further comprise a storage device 120, such as one or more hard drives. The components of rebate processing device 100 can be interconnected using a standards based bus system, such as Peripheral Component Interconnect (PCI), for example. The rebate processing device 100 may include various operating systems, hardware resources, and be on different network domains.

The operating systems may manage the various hardware resources and provide a graphical user interface (GUI).

Storage device 120 includes one or more data repositories having a variety of structured or unstructured content, such as file systems or databases. As shown, storage device 120 includes a rebate information repository 125, rebate form template repository 130, and global rebate request form repository 136. The rebate information repository 125 can include locations a rebate is available in, payment options (e.g. check, direct deposit, product offerings, etc.), currencies, value of the rebate, or other options selected by users, such as subscribers or customers, of a rebate processing service. In some embodiments, this information can be transmitted by a web service from a subscriber to a rebate processing device 100 when a customer purchases a product or pre-configured using a setup engine (not shown).

Rebate form template repository 130 may include one or more templates for a rebate that is offered by a manufacturer or retailer. Generally, a template may include terms and conditions and other information related to an offered rebate. The templates can be populated using information from rebate information repository 125, for example. A template can be used to generate dynamic rebate forms when a consumer requests to redeem a rebate offering.

Rebate processing device 100 and other devices shown, such as consumer device 150 and rebate center devices 170A-N, may include one or more engines. In general, the word engine (used interchangeably with the word module), as used herein, refers to logic embodied in hardware or software instructions, which can be written in a programming language, such as Java™, for example. A software engine can be compiled into executable programs or written in interpreted programming languages. Software engines may be callable from other engines or themselves. Generally, the engines described herein refer to logical modules that may be merged with other engines or divided into sub-engines despite their physical organization. The engines can be stored in any type of computer readable medium or computer storage device and be executed by one or more general purpose computers. In addition, the methods and processes disclosed herein can alternatively be embodied in one or more engines or specialized computer hardware.

As shown, rebate processing device 150 includes a form generation engine 135. Generally, form generation engine 135 can be executed when a subscriber of a rebate processing service redirects a consumer to a web site for redeeming a rebate or sends the consumer an email with a Uniform Resource Locator (URL) or hyperlink. Alternatively, the consumer may directly enter a URL into a web browser to request a product rebate using rebate request application 155. In an embodiment, the subscriber may encode various information related to the rebate within the URL as parameters, such as the product, amount of the rebate, currency, language, consumer address, consumer name, payment options, and the like. Alternatively, this information may be provided using a web service or other application.

Form generation engine 135 can detect a location of a consumer, and based on the location of the consumer, generate a rebate form in a language which corresponds to the location or preference of the consumer. For example, form generation engine 135 may query a web browser of the consumer, such as rebate request application 155, to determine the location of the consumer or language setting. After receiving this information, form generation engine 135 may dynamically generate a rebate form using a template from rebate form template repository 130. In particular, the queried location or language information can be used to select a corresponding form from rebate form template repository 130. The information related to the consumer and rebate offering which can be provided through a web service, encoded within a URL, or stored in rebate information repository 125, for example, can then be used to fill in other parts of the form. The generated rebate form may then be sent to rebate request application 155 using a network interface 115, for example. After generating the rebate form, form generation engine 135 may also transmit billing information to a subscriber of the rebate service to ensure that the rebate form can be processed and a rebate issued using funds from the subscriber's account, for example.

The generated rebate form can include terms and conditions of the rebate, information about the rebate such as currency and amount of the rebate, a name and address of the consumer, and a signature block for the consumer to sign. In addition, the generated rebate form may include a rebate identifier, such as a unique alphanumeric identifier, which identifies a rebate to transact with the consumer. The rebate identifier may be encoded as a bar code, for example.

The generated rebate form may also include one or more addresses specifying an address to mail the rebate form for processing. In an embodiment, form generation engine 135 may determine the address to mail the rebate form for processing based on the consumer address or detected location of the consumer from the rebate request application 155. Of note, the consumer address may be entered by the consumer or provided by the subscriber of the rebate service. Form generation engine 135 may check the address of the consumer to ensure it is valid, in some embodiments. Alternatively, the consumer address may be validated by a third party application, such as a web service, for validating addresses.

Rebate processing device 100 may further include a global rebate request form repository 136. Global rebate request form repository 136 may include electronic copies of the generated rebate forms sent to consumer(s). For example, after transmitting a generated rebate form to a consumer, the form generation engine 135 may store the rebate form, information from the rebate form, or rebate transaction identifier in global rebate request form repository 136. The rebate identifier may later be used to validate a rebate request form, which may be completed by the consumer, during processing of the rebate by form processing engine 140.

As shown, rebate processing device can also include form processing engine (or collection and validation engine) 140 to receive electronic rebate forms which have been completed from a plurality of rebate center devices 170A-N. The plurality of rebate center devices 170A-N may be distributed in different countries, for example. The received electronic rebate forms may be stored in global rebate request form repository 136. Form processing engine 140 can verify the rebate identifiers which identify various rebates to transact with consumers are not fraudulent. In some embodiments, when the rebate identifiers are encoded as a bar code, for example, form processing engine 140 may decode and extract the rebate identifiers. The extracted rebate identifiers can then be checked against information related to generated rebate forms which may reside in global rebate request form repository 136, to ensure that the rebate identifiers are valid and have not already been processed by form processing engine 140.

Rebate processing device 100 may further include a payment engine 145 to generate a payment using a payment method for each of the validated rebate identifiers. The payment method can be based on the location of the consumer or use information from the rebate information repository 125. For example, the payment method can include various types of currencies and rebate amounts. Payment method can also include a check from a financial institution, such as a bank, that resides in the geographic location of the consumer or a deposit to a financial institution that resides in the geographic location of the consumer. In addition, the payment method may include a transfer from a first bank based on the location of the consumer to a second bank selected by the consumer. Alternatively, payment method can include a gift certificate, product offering, coupon, or a combination of the payment methods described herein. Of note, payment method may be selected using the location of the consumer or other options selected by the subscriber of the rebate service or consumer.

The rebate center devices 170A-N may be a computing system, such as one or more computer servers or a peer-to-peer architecture, mobile device, or other device that allows a user, to exchange information with the rebate processing device 100. Rebate center devices 170A-N can include one or more central processing units (CPUs), a memory, such as random access memory (RAM), to store information temporarily or permanently, one or more input/output (I/O) devices and interfaces, such as a network interface or card, keyboard, and the like to receive or transmit data. Rebate center devices 170A-N may further comprise a storage device, such as one or more hard drives. The storage device includes one or more data repositories having a variety of structured or unstructured content, such as file systems or databases. Components of rebate center devices 170A-N can be interconnected using a standards based bus system, such as Peripheral Component Interconnect (PCI), for example. The rebate center devices 170A-N may include various operating systems, hardware resources, and be on different network domains. The operating systems may manage the various hardware resources and provide a graphical user interface (GUI).

The plurality of rebate center devices 170A-N may be distributed in different geographic areas, locations, or countries. In some embodiments, the plurality of rebate center devices 170A-N may correspond to one or more of the mailing addresses placed on the generated rebate forms. The rebate center devices 170A-N generally receive rebate forms, which are completed by consumers to redeem rebates in local service areas. The rebate forms can be sent over network 180, using a variety of methodologies, such as by a web browser or electronic mail application. In some embodiments, physical delivery mechanisms can be used, such as postal mail. The completed rebate forms may be in an electronic format. Alternatively, when the completed rebate forms are in a paper format, they may be scanned into an electronic format. The plurality of rebate center devices 170A-N typically send the completed rebate forms to the rebate processing device 100 for processing over a network interface 115.

Figure 1B:
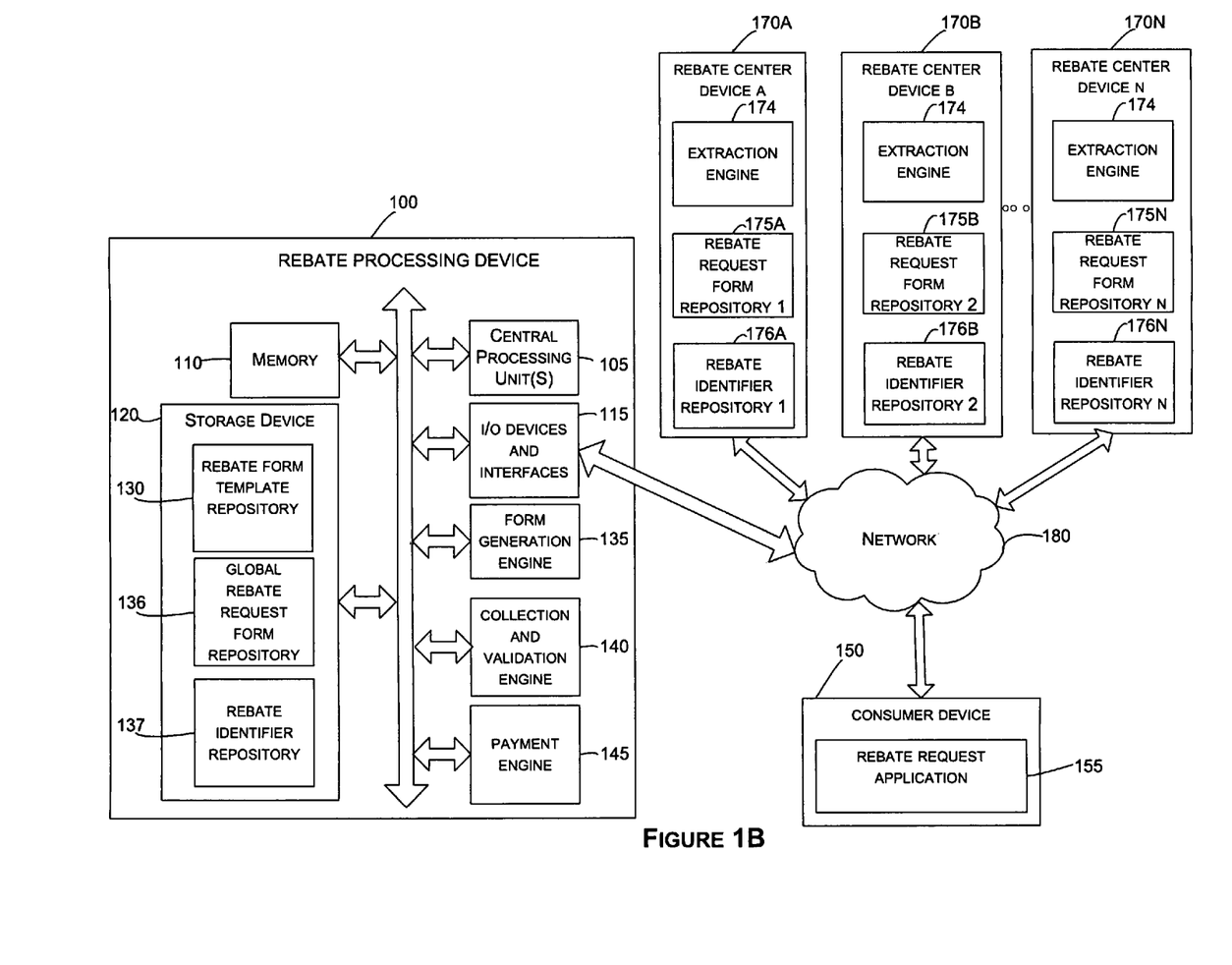

FIG. 1B illustrates a block diagram of an exemplary system for processing rebates which is optimized. As shown, rebate processing device 100 may include a storage device 120 having a rebate identifier repository 137 which stores identifiers transmitted from the plurality of rebate center devices 170A-N. Rebate processing device 100 may further comprise a collection and validation engine 140 which can expedite processing of rebates by processing data in rebate identifier repository 137.

In the illustrated embodiment, the plurality of rebate center devices 170A-N include an extraction engine 174, rebate request form repositories 175A-N, and rebate identifier repositories 176A-N. When one of the plurality of rebate center devices 170A-N receives a rebate form completed by a consumer, the form can be stored in a respective rebate request form repository 175A-N electronically. Extraction engine 174 generally extracts rebate identifiers from each of the completed rebate forms in rebate request form repositories 175A-N, and stores the extracted rebate identifiers in rebate identifier repositories 176A-N. The extraction engine 174 can extract the rebate identifiers by decoding a bar code placed on the completed rebate forms, for example. The extracted rebate identifiers from the rebate identifier repositories 176A-N may then be sent to the rebate processing device 100 to expedite processing of the completed rebate forms.

The collection and validation engine 140 of rebate processing device 100 can receive the extracted rebate identifiers from the plurality of rebate center devices 170A-N. Collection and validation engine 140 can verify the rebate identifiers which identify various rebates to transact are not fraudulent. For example, the rebate identifiers can be checked against the global rebate request form repository 136 to ensure that the identifiers are valid and have not previously been processed by collection and validation engine 140. Payment engine 145 can then generate a payment using a payment method for each of the validated rebate identifiers. The collection and validation engine 140 may also receive the completed rebate forms associated with the rebate identifiers from the plurality of rebate centers devices 170A-N, after the rebate identifiers are initially received and store the completed rebate forms in global rebate request form repository 136, for example.

Figure 1C:
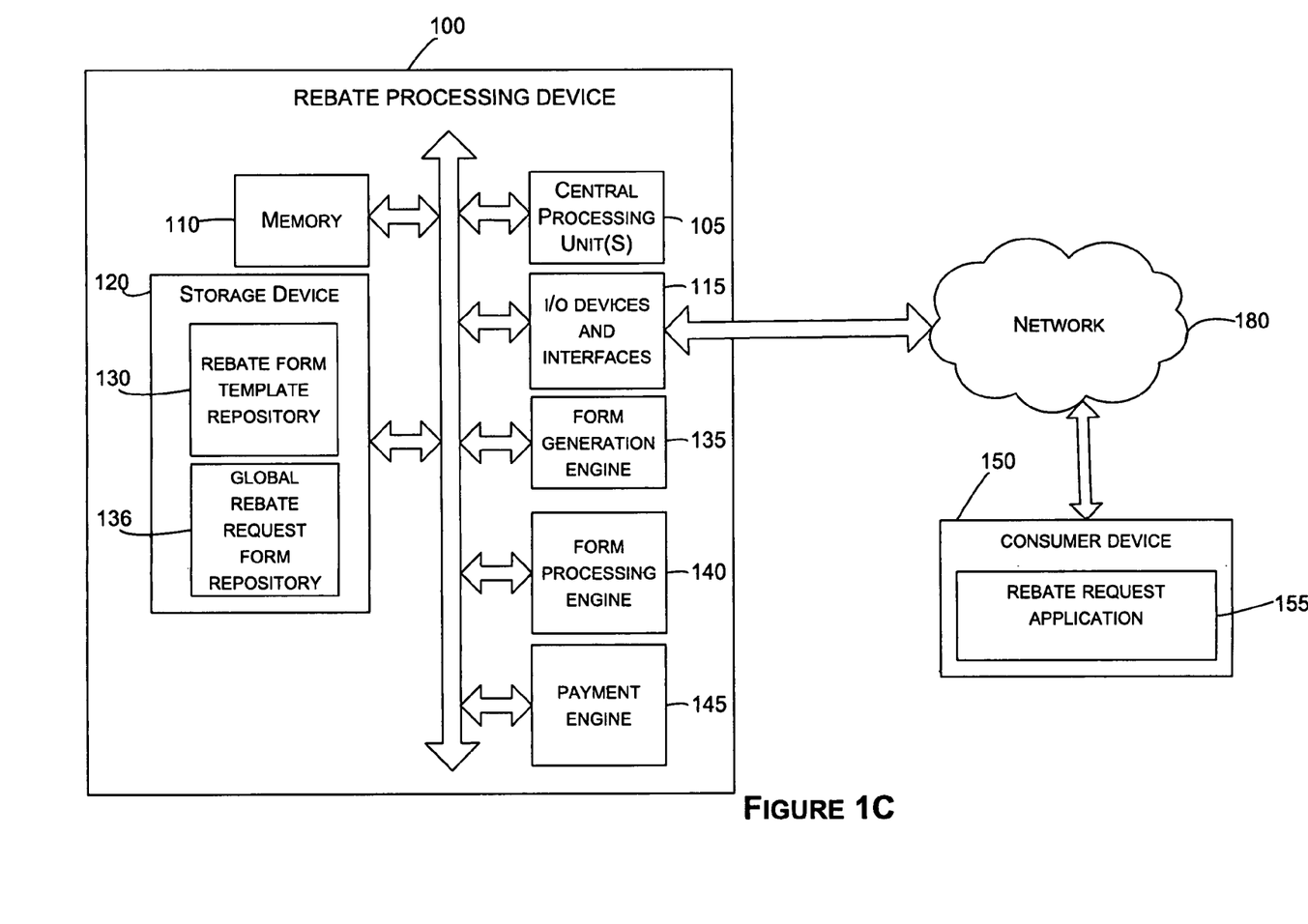

FIG. 1C illustrates a block diagram of an exemplary system for processing rebates. As shown, consumer device 150 communicates directly with rebate processing device 100 over network 180 to request redemption and processing of a rebate. The plurality of rebate center devices 170A-N described with reference to FIGS. 1A-B may not necessarily be used.

In exemplary embodiments, after the consumer completes a rebate form generated by rebate processing device 100, the consumer may send the completed rebate form to rebate processing device 100 electronically or physically. Rebate processing device 100 may store the completed rebate form in global rebate request form repository 136 electronically, extract the rebate identifier from the completed rebate form, and process the rebate using form processing engine (or collection and validation engine) 140. A payment to the consumer can then be made using payment engine 145, as previously described.

Figure 2:
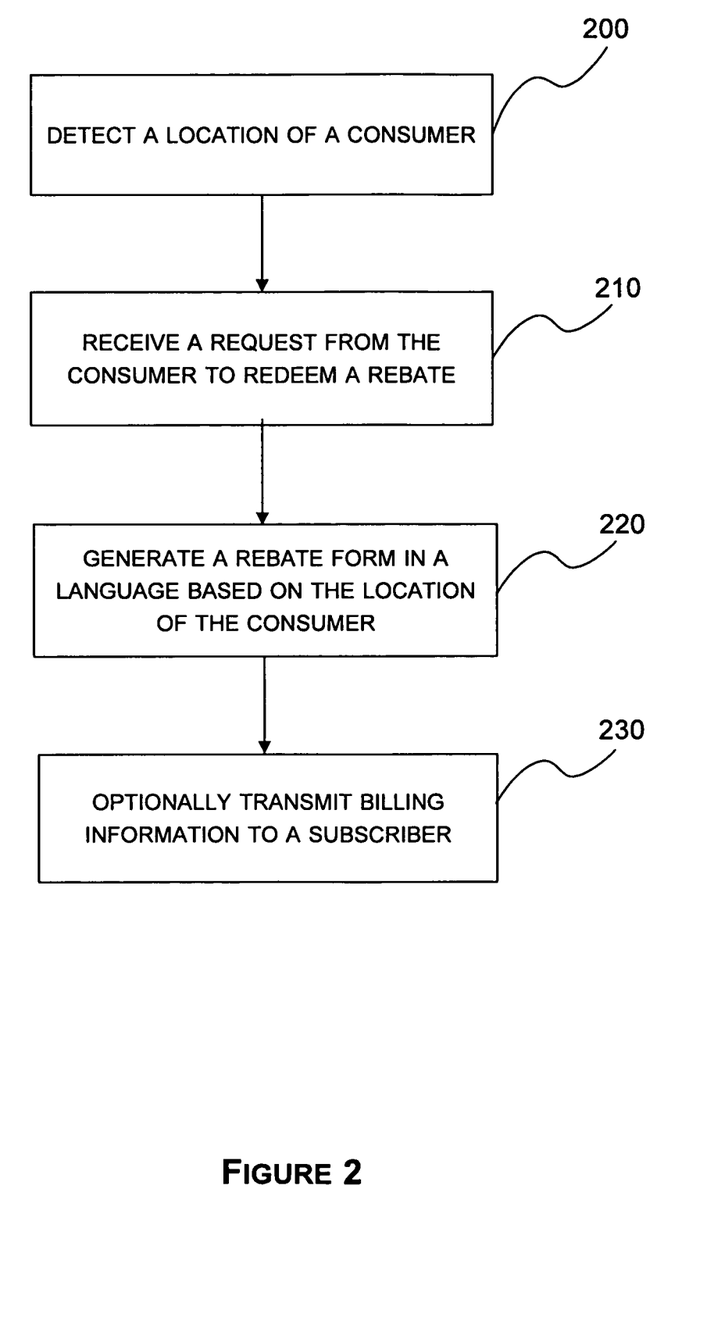
FIG. 2 illustrates a form generation routine performed by exemplary components of the rebate processing device of FIGS. 1A-C, according to an embodiment of the disclosure.

FIG. 2 illustrates a form generation routine performed by exemplary components of the rebate processing device 100 of FIGS. 1A-C. In some embodiments, this routine can be performed by form generation engine 135. Depending on the embodiment, the method of FIG. 2 can include fewer or additional blocks, and blocks can be performed in an order which may be different than illustrated.

Beginning in block 200, a location of a consumer is detected. In an embodiment, the consumer may be a buyer of a product or service that is interested in a rebate offer. The location of the consumer may be provided by a subscriber of a rebate service using a web service, encoded in a URL, or detected by querying a software application used by the consumer, such as rebate request application 155, for example.

Moving to block 210, a request from the consumer to redeem a rebate is received. The request typically can be for a specific product or service rebate offered by a retailer or manufacturer, for example. The information related to the rebate, such as locations the rebate is available in (e.g. cities, counties, states, countries, or continents), payment options (e.g. check or direct deposit), currencies (e.g. US dollar or euro), and amount of the rebate can be transmitted to the rebate processing service. For example, the subscriber of the rebate processing service can use a web service to transmit this information when the customer purchases a product, or may pre-configure rebate processing device 100 with this information.

At block 220, a rebate form is generated in a language based on the location of the consumer. The rebate form can also be generated in a language based on the preference of the consumer. For example, the language may be provided by a subscriber of a rebate service using a web service, encoded in a URL, or detected by querying a software application used by the consumer, such as rebate request application 155. A rebate form can then be generated using a template residing in rebate form template repository 130, for example.

The rebate form may include terms and conditions of the rebate, information about the rebate such as currency and amount of the rebate, a name and address of the consumer, a signature block for the consumer to sign, and/or a rebate identifier. The generated rebate form may also include one or more addresses specifying an address to mail the rebate form for processing based on the consumer address. For example, the one or more addresses may be close in proximity to the consumer address or reside in the same general region as the consumer. The generated rebate form may further include the detected location of the consumer, a contact address entered by the consumer, or a consumer residence or mailing address provided by the subscriber of the rebate service. The generated rebate form may then be sent to the consumer (not shown).

Continuing block 230, billing information can optionally be transmitted to a subscriber of the rebate service. For example, when the consumer subsequently requests to redeem the rebate using the generated rebate form, it can be particularly useful to have adequate funds to cover the cost of the rebate. In some embodiments, the subscriber of the rebate service may reimburse the rebate service provider after a fixed time period (e.g. days, weeks, months, and the like).

Figure 3:
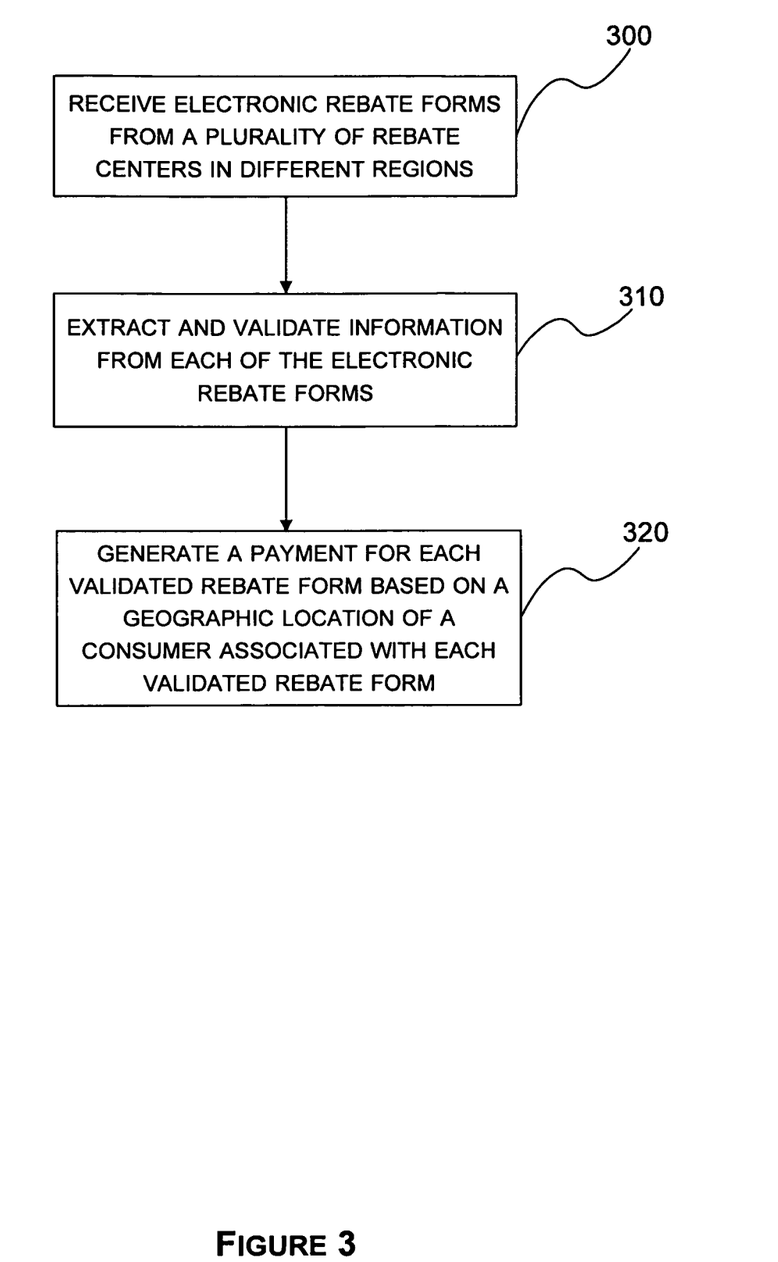
FIG. 3 illustrates form processing and payment routines performed by exemplary components of the rebate processing device of FIG. 1A, according to an embodiment of the disclosure.

FIG. 3 illustrates form processing and payment routines performed by exemplary components of the rebate processing device 100 of FIG. 1A. The exemplary routines can be stored as a process accessible by form processing engine 140 and payment engine 145, or other components of rebate processing device 100. Depending on the embodiment, some of the blocks described below can be removed, others may be added, and the sequence of the blocks may be different.

Beginning in block 300, electronic rebate forms from a plurality of rebate centers in different regions are received. Typically, the electronic rebate forms have been completed by consumers to redeem a rebate offering. In an embodiment, the rebate centers comprise one or more rebate center devices 170A-N, as described above. The received electronic rebate forms are typically stored in computer storage, such as global rebate request form repository 136.

Moving to block 310, information from each of the electronic rebate forms is extracted and validated. In exemplary embodiments, rebate identifiers which identify various rebates to transact are extracted and verified. For example, when a rebate identifier may be encoded as a bar code, the bar code is decoded and the rebate identifier is extracted. The extracted rebate identifiers can then be checked to ensure that the identifiers are valid, have not already been processed, and/or are not fraudulent using global rebate request form repository 136, for example.

Continuing to block 320, a payment for each of the validated rebate forms is generated based on a geographic location of a consumer associated with each validated rebate form. For example, the payment can be selected based on the location of the consumer using information provided by a subscriber of the rebate service and/or in rebate information repository 125. In an embodiment, the payment can include a check from a financial institution, such as a bank, which resides in the geographic location of the consumer or a deposit to a financial institution that resides in the geographic location of the consumer. The payment may further include a transfer from a first bank based on the location of the consumer to a second bank selected by the consumer. In addition, the payment can include a type of currency and value which can be based on the location of the consumer.

Figure 4:
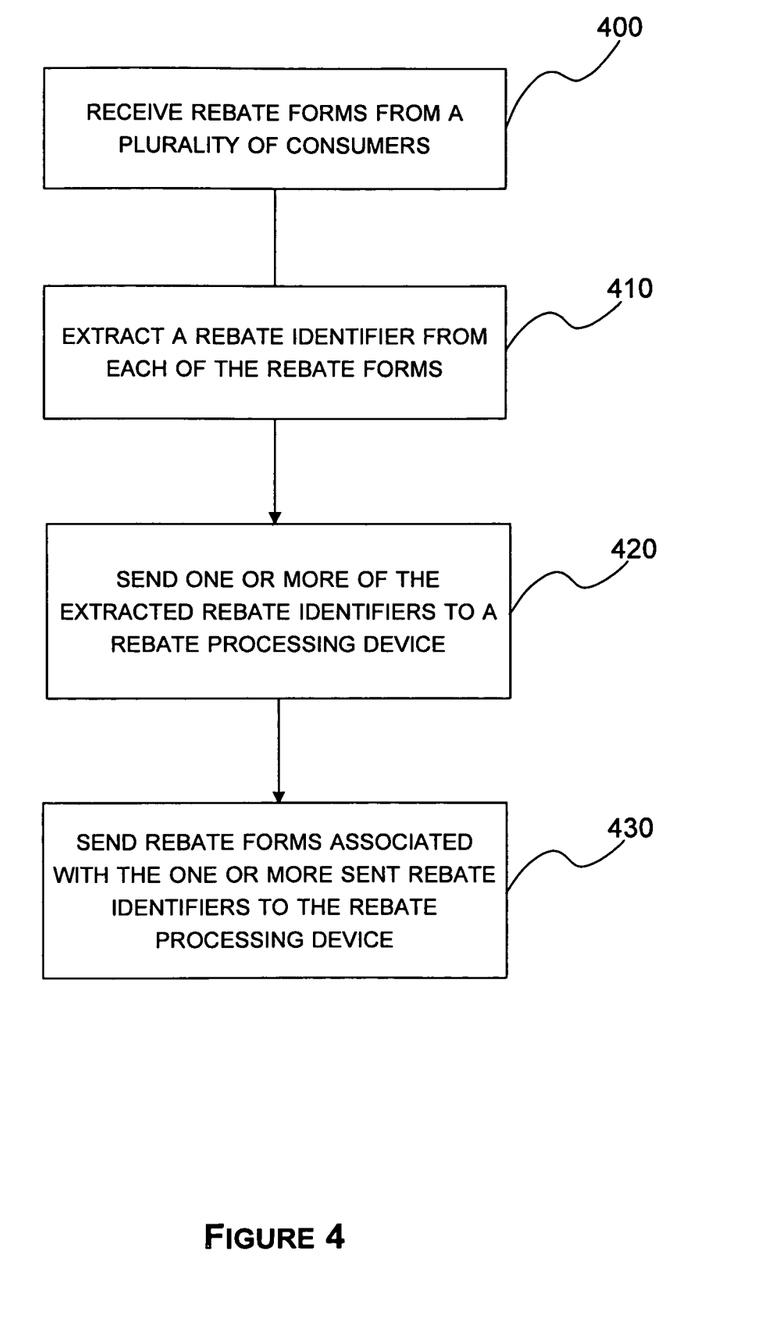
FIG. 4 illustrates a form extraction routine performed by exemplary components of the plurality of rebate center devices of FIG. 1B, according to an embodiment of the disclosure.

FIG. 4 illustrates a form extraction routine performed by exemplary components of the plurality of rebate center devices 170A-N of FIG. 1B. In some embodiments, this routine can be performed by extraction engine 174 or other components of rebate center devices 170A-N. Depending on the embodiment, the method of FIG. 4 can include fewer or additional blocks, and blocks can be performed in an order which may be different than illustrated.

Beginning in block 400, rebate forms are received from a plurality of consumers. Typically, each rebate center device 170A-N receives rebate forms from respective consumers residing in substantially the same geographic region. In an embodiment, the rebate forms have been completed by consumers to redeem a rebate offer. The received rebate forms can be received electronically or physically in paper format. Of note, when the rebate forms are received physically, letter and envelope openers may be used, such as automated extractors and openers, electronic envelope and mail openers, and the like to extract rebate forms stored inside envelopes, for example. The received rebate forms can then be stored in computer storage, such as rebate request form repository 175A-N, using scanning technologies.

At block 410, rebate identifiers(s) from each of the rebate forms is extracted. The rebate identifiers may identify various rebates to transact and can be extracted from the electronic rebate forms using image recognition, text recognition, or bar code technologies. For example, when the rebate identifier is encoded as a bar code, the bar code can be decoded and the rebate identifier determined. The extracted rebate identifiers can then be stored in respective rebate identifier repositories 176A-N at each rebate center device 170A-N.

Moving to block 420, one or more of the extracted rebate identifiers are sent to a rebate processing device 100. Typically, the extracted rebate identifiers are sent over a network interface to rebate processing device 100 to expedite processing of the rebate forms. This can be particularly beneficial because when rebate identifiers are received by rebate processing device 100, the associated rebates to transact can be processed nearly immediately.

Continuing to block 430, rebate forms associated with the one or more sent rebate identifiers are sent to the rebate processing device 100. In some embodiments, sending the corresponding rebate forms separate from the rebate identifiers can speed up rebate processing. For example, sending the entire rebate forms may take up unnecessary bandwidth on network 180 and delay processing. Advantageously, sending the rebate identifiers ahead of time to rebate processing device 100 can allow rebates to be processed once the rebate identifiers are received.

Figure 5:
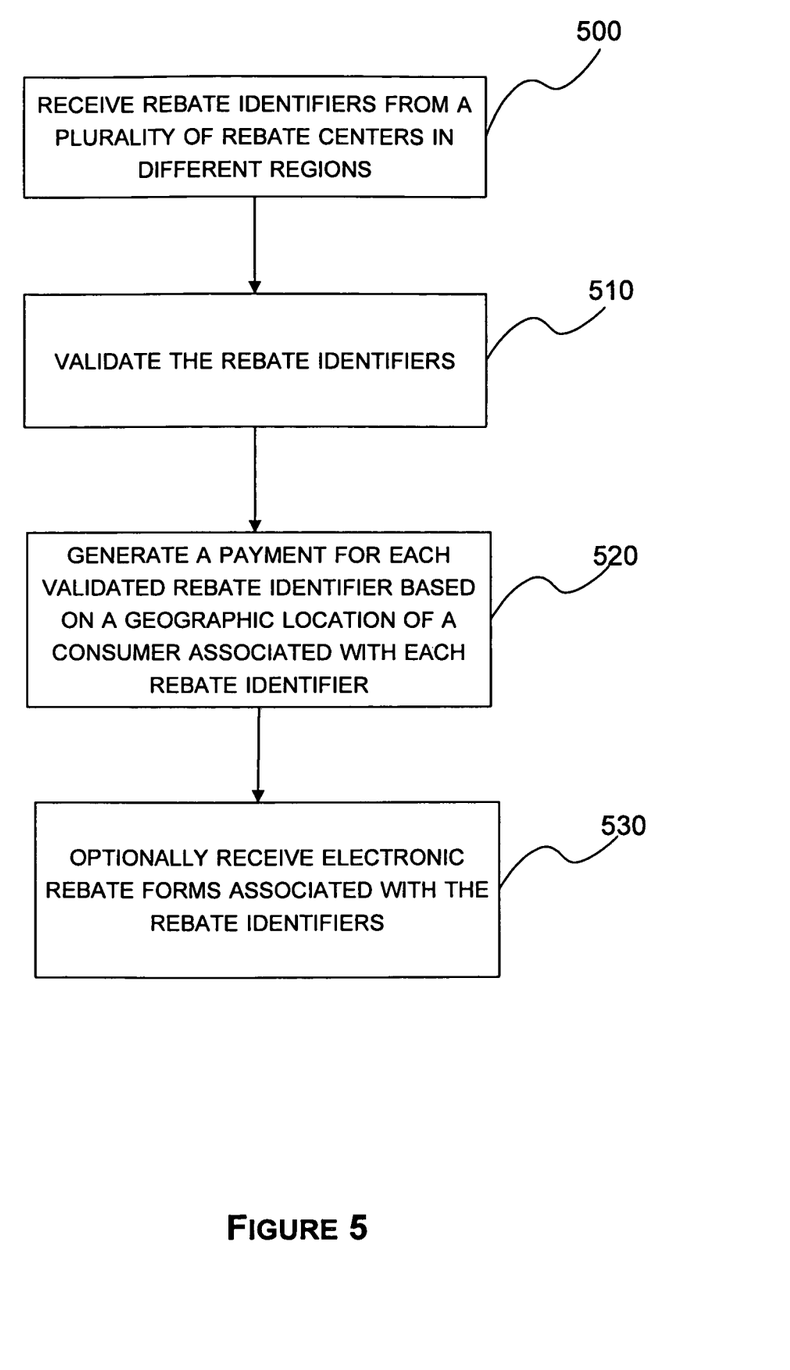
FIG. 5 illustrates form processing and payment routines performed by exemplary components of the rebate processing device of FIG. 1B, according to an embodiment of the disclosure.

FIG. 5 illustrates form processing and payment routines performed by exemplary components of the rebate processing device 100 of FIG. 1B. In some embodiments, these routines can be performed by collection and validation engine 140, payment engine 145, or other components of rebate processing device 100. Depending on the embodiment, the method of FIG. 5 can include fewer or additional blocks, and blocks can be performed in an order which may be different than illustrated.

Beginning in block 500, rebate identifiers from a plurality of rebate centers in different regions are received. In an embodiment, the rebate centers comprise one or more rebate center devices 170A-N, as described above. Generally, the rebate identifiers may identify rebates to transact with consumers and may be a sequence of alphanumeric characters. The received rebate identifiers are typically stored in computer storage, such as rebate identifier repository 137.

Moving to block 510, the rebate identifiers are validated. In exemplary embodiments, the rebate identifiers can be checked to ensure that the rebates to transact are not fraudulent. For example, the received rebate identifiers can be checked against information in global rebate request form repository 136 to determine whether the rebate identifiers are valid or have already been processed. When either of these conditions are satisfied, the rebate identifier may not be processed any further.

At block 520, a payment for each of the validated rebate identifiers is generated based on a geographic location of consumer(s) associated with each validated rebate identifier. The payment can be generated based on the location of the consumer(s) using information provided by a subscriber of the rebate service and/or in rebate information repository 125. The payment can include a check from a financial institution, such as a bank, which resides in substantially the same geographic location as the consumer or a deposit to a financial institution which resides in substantially the same geographic location as the consumer. The payment may further include a transfer from a first bank based on the location of the consumer to a second bank selected by the consumer. In addition, the payment can include a type of currency and value which can be based on the location of the consumer. In some embodiments, payment may also include a gift certificate, product offering, and/or combination of multiple payment types.

Continuing to block 530, electronic rebate forms associated with the received rebate identifiers are optionally received. Receiving the corresponding rebate forms separately from the rebate identifiers can advantageously speed up rebate processing. For example, receiving the entire rebate forms may take up unnecessary bandwidth on network 180 and delay processing and payment of the rebate to consumers. Receiving the rebate identifiers beforehand (as described in block 500) can allow rebates to be processed in real time or near real time, for example. When received, the electronic rebate forms may be stored in global rebate request form repository 136.

Figure 6:
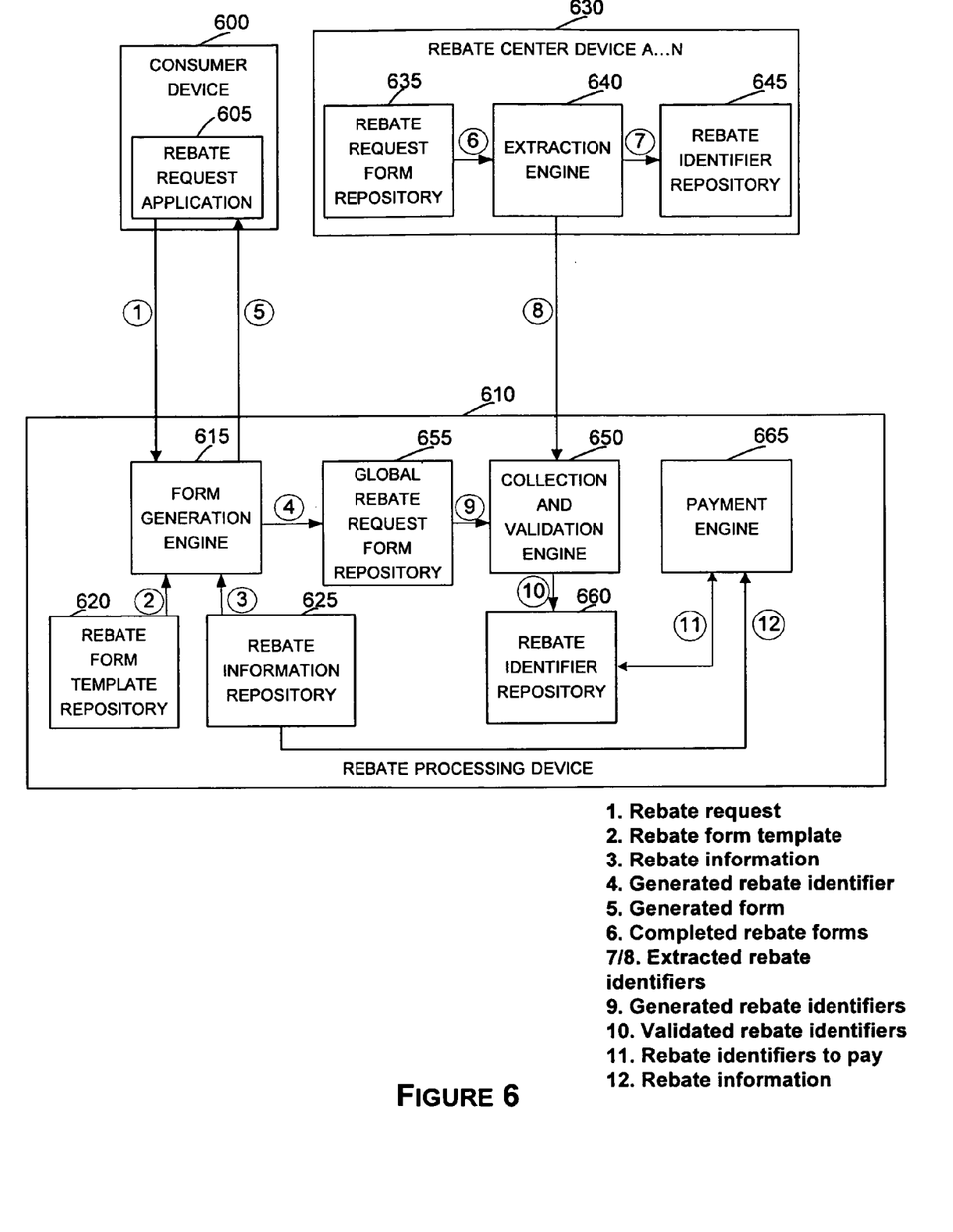
FIG. 6 illustrates a flow diagram of rebate processing performed by the exemplary components of the systems of FIGS. 1A-B, according to an embodiment of the disclosure.

FIG. 6 illustrates a flow diagram of rebate processing performed by the exemplary components of the systems of FIGS. 1A-B. In some embodiments, this routine can be performed by components of rebate processing device 100, consumer device 150, and rebate center devices 170A-N. Depending on the embodiment, the method of FIG. 6 may include fewer or additional blocks and blocks may be performed in an order that may be different than illustrated.

Beginning in block 600, a rebate request application 155 may be running on consumer device 150. Rebate request application 155 may allow the user, such as a consumer or buyer of a product or service, to receive a rebate form from rebate processing device 100. Rebate request application 155 can include an application running in a web browser or an electronic mail client, for example. Moving to block 605, rebate request application sends a request to redeem a rebate offering to rebate processing device 100. The request can be sent over network 180, as described with respect to FIGS. 1A-C, above.

Moving to block 610, the request to redeem a rebate is received by rebate processing device 100 over network 180, for example. Rebate processing device 100 generally provides a rebate processing service to subscribers, such as manufacturers or retailers, to administer and process rebate offerings in multiple geographic areas, currencies, and/or languages. Continuing to block 615, form generation engine 135 can be executed on rebate processing device 100 to dynamically create a customized rebate form. At block 620, form generation engine 135 queries rebate form template repository 130 for a rebate form template related to the rebate redemption request from the consumer. The template may include terms and conditions and other information related to the offered rebate. At block 625, form generation engine 135 also queries the rebate information repository 125 to obtain information related to the rebate redemption request.

With continued reference to block 615, after receiving information about the rebate offering, form generation engine 135 can generate a rebate identifier and update global rebate request form repository 136 with the generated rebate identifier. Rebate identifier may identify a rebate to transact with the consumer. The rebate form template, information from the rebate information repository 125, and the rebate identifier may be combined to create the rebate request form. For example, the rebate request form may include a mailing address to mail the form for processing, which may based on the location of the consumer, and the generated rebate identifier encoded as a bar code. In addition, the rebate request form may include terms and conditions related to the rebate offering. The generated rebate request form can then be sent to the rebate request application 155 of consumer device 150 over network 180.

Moving to block 630, rebate center devices 170A-N receive completed rebate form(s) from consumer(s). Usually, each rebate center device 170A-N receives rebate forms from respective consumers residing in substantially the same geographic region. In an embodiment, the rebate forms have been completed by consumers to redeem a rebate offer. The completed rebate form can be transmitted by rebate request application 155 or physically delivered to rebate center device 170A-N. At block 635, the completed rebate form can be stored in rebate request form repository 175A-N.

At block 640, extraction engine 174 extracts rebate identifiers(s) from each of the completed rebate forms. The rebate identifiers may identify various rebates to transact with consumers and can be extracted from the electronic rebate forms using image recognition or bar code technologies. When the rebate identifier is encoded as a bar code, the bar code can be decoded and the rebate identifier determined. Continuing to block 645, the extracted rebate identifiers can then be stored in rebate identifier repositories 176A-N at respective rebate center devices 170A-N.

Moving to block 650, collection and validation engine 140 of rebate processing device 100 receives the extracted rebate identifiers from the plurality of rebate center devices 170A-N. Collection and validation engine 140 may then verify the extracted rebate identifiers are not fraudulent. At block 655, the extracted rebate identifiers can be checked against the generated rebate identifiers residing in global rebate request form repository 136 by collection and validation engine 140. This can ensure that the extracted rebate identifiers are valid and have not previously been processed by collection and validation engine 140.

Moving to block 660, the validated rebate identifiers are stored in rebate identifier repository 137 by collection and validation engine 140. Continuing to block 665, payment engine 145 can generate a payment using a payment method for one or more of the validated rebate identifiers residing in rebate identifier repository 137. The payment method can be determined using the geographic location of the user associated with the rebate identifier and/or information residing in rebate information repository 125.

It will be apparent to those skilled in the art that various modifications and variations can be made in the present disclosure without departing from the spirit or scope of the disclosure. Thus, it is intended that the present disclosure cover any modifications and variations within the scope of the appended claims and their equivalents.

What is claimed is:

1. A rebate system for administering rebates on a global scale, the system comprising:
    a rebate processing device including:
        a network interface card which receives a request from a consumer device for a rebate;
        a computer memory which stores rebates forms in a plurality of languages; and
        a processor which detects a location of the consumer device, and based on the location of the consumer, generates a first rebate form having a first rebate identifier in a language corresponding to the location of the consumer device, and sends the first rebate form over the network interface card to the consumer; and
    a first rebate center device of a plurality of rebate center devices that are distributed in different geographic areas, the first rebate center device selected by the processor based on: (i) residency in the same country as the detected location of the consumer device; and (ii) a calculation of proximity of an address of a corresponding first rebate center to the detected location of the consumer device, wherein the first rebate center device receives a completed first rebate form from the consumer device and extracts the first rebate identifier,
    wherein the processor receives from the first rebate center device the extracted first rebate identifier corresponding to the respective completed first rebate form that identifies a rebate to transact with the consumer device,
    wherein the processor verifies that the rebate to transact is not fraudulent and has not already been transacted, and generates a payment in real time or near real time for the verified first rebate identifier using a currency that is based on the geographic area of the first rebate center device.

2. The rebate system of claim 1, wherein the processor authorizes the request from the consumer for the rebate and selects a payment method based on the location of the consumer.

3. The rebate system of claim 2, wherein the payment method comprises a transfer from a first bank based on the location of the consumer to a second bank selected by the consumer.

4. The rebate system of claim 2, wherein the payment method comprises a check from a bank based on the location of the consumer.

5. The rebate system of claim 2, wherein the payment method comprises a type of currency and an amount.

6. The rebate system of claim 1, wherein the processor authorizes the request from the consumer for the rebate and pays the consumer using a payment method selected by a subscriber of a rebate service.

7. The rebate system of claim 1, wherein the stored rebate forms are templates and include terms and conditions of rebates and the processor generates the first rebate form using one of the stored rebate forms.

8. A rebate system for administering rebates on a global scale, the system comprising:
    a rebate processing device including:
        a network interface card which receives a request from a consumer device for a rebate;
        a computer memory which stores rebates forms in a plurality of languages; and
        a processor which:
            detects a location of the consumer device,
            determines that a rebate type is available in the state and country of the detected location of the consumer device, and, based on the location of the consumer, generates: (i) a first rebate form having a first rebate identifier associated with a rebate to transact in a language corresponding to the location of the consumer device; and (ii) an address of a first rebate center,
            wherein the first rebate center is selected from a plurality of rebate centers that are distributed in different geographic areas based on: (i) residency in the same country as the detected location of the consumer device; and (ii) a calculation of proximity of the address of the first rebate center to the detected location of the consumer device, and
            sends the first rebate form over the network interface card to the consumer;
    wherein the processor of the rebate processing device:
        receives from a first rebate center device corresponding to the first rebate center, an extracted first rebate identifier corresponding to a respective completed first rebate form that identifies the rebate to transact with a consumer device, and
        calculates a payment in real time or near real time for the verified first rebate identifier in a currency and an amount that is based on the geographic area of the first rebate center device.

9. The rebate system of claim 8, wherein the processor generates the payment using a payment option.

10. The rebate system of claim 9, wherein the payment option comprises a bank transfer.

11. The rebate system of claim 9, wherein the payment option comprises a check.

12. The rebate system of claim 9, wherein the payment option is selected by a subscriber of a rebate service.

13. The rebate system of claim 8, wherein the stored rebate forms are templates and include terms and conditions of rebates and the processor generates the first rebate form using one of the stored rebate forms.

14. The rebate system of claim 8, wherein the processor verifies that the rebate to transact is not fraudulent and has not already been transacted.

* * * * *